June 5, 1962 W. R. MILLER ETAL 3,037,402
BORING MACHINE
Filed Nov. 12, 1958 7 Sheets-Sheet 1

FIG. 1.

INVENTORS
WILLIAM R. MILLER,
GEORGE B. ANDERSON,
FRANCIS E. COMPTON,
BY PETER HOLD

*B. Schlesinger*
Attorney

FIG. 3.

INVENTORS
WILLIAM R. MILLER,
GEORGE B. ANDERSON,
FRANCIS E. COMPTON,
PETER HOLD
BY
*W. Schlesinger*
Attorney June 5, 1962  W. R. MILLER ETAL  3,037,402
BORING MACHINE
Filed Nov. 12, 1958  7 Sheets-Sheet 4

FIG. 4.

INVENTOR
WILLIAM R. MILLER,
GEORGE B. ANDERSON,
FRANCIS E. COMPTON,
PETER HOLD
BY
*Attorney*

INVENTORS
WILLIAM R. MILLER,
GEORGE B. ANDERSON,
FRANCIS E. COMPTON,
PETER HOLD
BY
Attorney

United States Patent Office 3,037,402
Patented June 5, 1962

3,037,402
BORING MACHINE
William R. Miller, George B. Anderson, and Francis E. Compton, Rochester, N.Y., and Peter Hold, Milford, Conn., assignors to Consolidated Machine Tool Division of Farrel-Birmingham Company, Inc., Rochester, N.Y., a corporation of Connecticut
Filed Nov. 12, 1958, Ser. No. 773,278
11 Claims. (Cl. 77—4)

The present invention relates to boring machines, and more particularly to car wheel borers.

Car wheels are attached to their axle by friction alone. They have to constantly withstand high velocity shock and impact and at speeds up to 70 miles an hour or more and at temperatures varying from below 0° to 100° above or more. The wheel bores, therefore, have to be straight, round, and concentric.

In the conventional car wheel borer, the work is secured to a rotary table or spindle, which is rotated continuously during the boring operation; and the boring tool is secured in a ram that is reciprocable in the direction of the work spindle axis. This ram is mounted upon an upright that is fixed to the bed of the machine. The work is clamped to the table or spindle by a jaw chuck whose jaws are moved into and out of chucking position by cams that actuate slides on which the jaws are mounted. The cams are secured to the bevel gear which drives the spindle; and when the table is started the jaws automatically move in together and grip the wheel. The heavier the cut, the tighter they grip. A momentary reversal of the driving motor opens the jaws and releases the wheel instantly.

In the conventional machine, the diameter of the hole to be bored is determined by the setting of the boring tools. Ordinarily there are two roughing tools, two finishing tools and two chamfering tools mounted on the boring bar, the two tools of each set being disposed in diametrically opposed relation. The diametral distance between the cutting edges of the roughing tools determines the rough diameter of the hole bored in the wheel. The diametral distance between the cutting edges of the finishing tools determines the finished diameter of the bore; and the diametral distance between the cutting edges of the chamfering tools determines the diameter of the chamfer surface which is produced on the work.

One object of the present invention is to provide a boring machine which will more precisely bore a hole of a desired diameter in a workpiece such as a car wheel.

Another object of the invention is to provide a boring machine in which the machine settings for diameter of the hole to be bored are controlled by measurement of the part which is to go in that hole; in the case of car wheels by measurement of the wheel bearing fit of the axle on which the wheel is to be mounted. An aim of the invention, therefore, is to bore a hole in an article, such as a car wheel, to a size to precisely fit a part, such as an axle, which is intended to fit into the hole, regardless of the diameter of the part.

Another object of the invention is to provide an improved chucking mechanism for chucking the work on a machine such as a car wheel borer, a chucking mechanism which will automatically clamp the work on the work spindle when the spindle is rotated in one direction, and automatically unclamp it when the work spindle is rotated in the opposite direction.

Other objects of the invention will be apparent hereinafter from the specification and from the recital of the appended claims.

Figure 1:
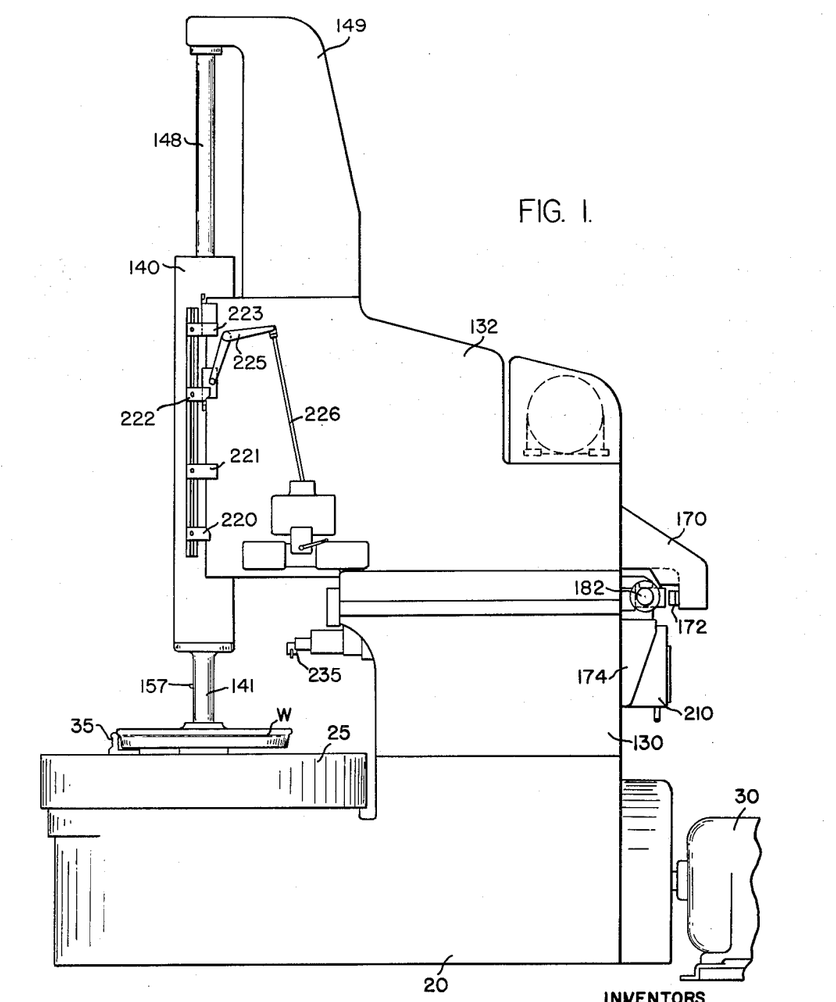
FIG. 1 is a side elevation of a boring mill built according to one embodiment of this invention.

Referring now to the drawings by numerals of reference, 20 denotes the base or bed of the machine. Journaled in the base on antifriction bearings 21 and 22 (FIG. 3) is the work spindle 24 to which the work table 25 is rigidly secured in any suitable manner. The work table is adapted to be driven from a drive motor 30 (FIG. 1) through a belt and pulley drive (not shown), the shaft 31 (FIG. 3), the bevel pinion 32, which is keyed to this shaft, and the bevel gear 33 which is fastened to the underside of the table 25.

To clamp the work to the work table 25 a plurality of chuck jaws 35 (FIGS. 3 and 5) are provided, five in the instance shown. Each chuck jaw may be adjustably secured according to conventional practice to a block 36 by adjusting screws (not shown) for adjustment relative to its block 36 radially of the axis of the work spindle 24. Each block 36 may be serrated on its underside according to conventional practice for adjustable engagement with the correspondingly serrated upper surface of a slide 42. Each block 36 may be fastened by a screw 37 to a block 38, which is adapted to slide in the leg portion 39 of an inverted T slot 40, which is formed in the associated slide 42 and which extends radially of work spindle 24. The five slides 42 themselves are reciprocable radially of the work spindle in guide slots formed in the table 25.

Figure 3:
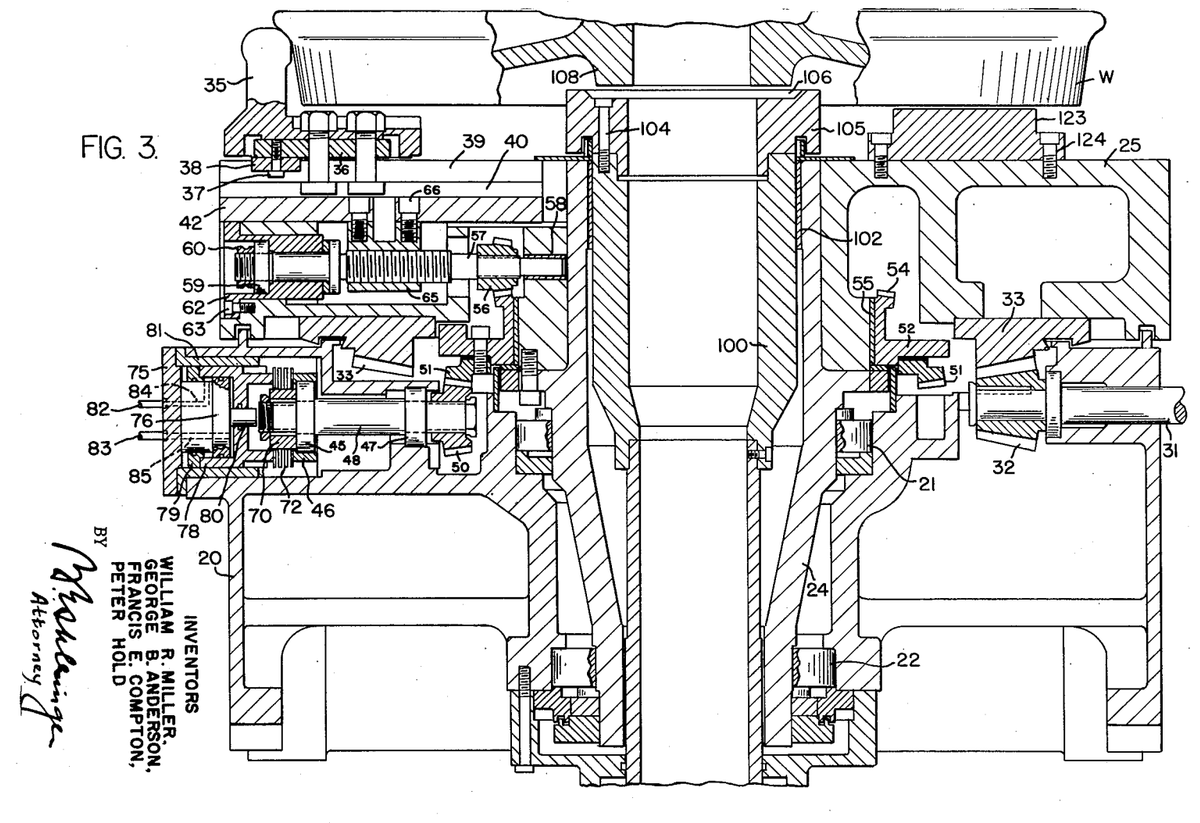
FIG. 3 is a fragmentary axial section on a further enlarged scale showing the work spindle of the machine and a car wheel secured thereto.
Figure 5:
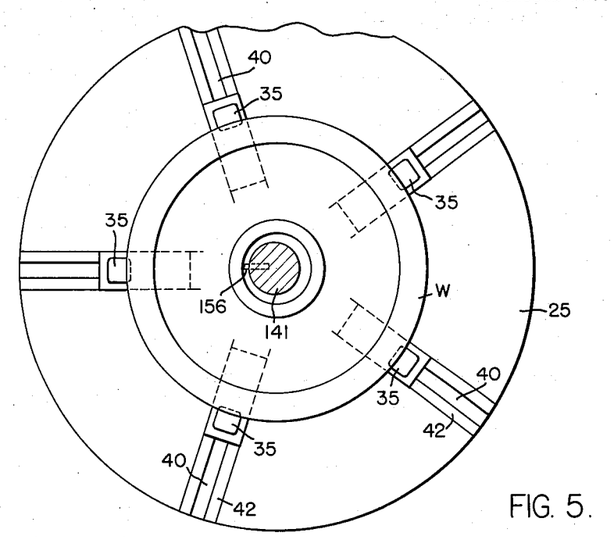
FIG. 5 is a fragmentary plan view of the work table on the scale of FIG. 2, showing a car wheel chucked thereon.

The motion of the table itself is used to chuck and dechuck the work.

Journaled on an antifriction bearing 45 in a retainer 46 and on an anti-friction bearing 47 in the bed 20 is a shaft 48. This shaft has a bevel pinion 50 secured to it which meshes with a bevel gear 51 that is bolted to the flange 52 of a bevel gear 54 that is journaled by means of a plain bearing 55 on the table 25. Meshing with the bevel gear 54 are five bevel pinions 56, one for each chuck jaw. Each of the bevel pinions 56 is keyed to a shaft 57 that is journaled at its inner end by means of a plain bearing 58 in the table 25 and that is journaled at its outer end by means of an anti-friction bearing 59 in a sleeve 62. Bearing 59 is secured against axial movement relative to sleeve 62 and to shaft 57 by a nut 60 that threads on the shaft. The sleeves 62 are fastened to the table 25 by screws 63. Each shaft 57 is threaded intermediate its ends into a nut 65 which is secured by screws 66 to one of the slides 42.

Keyed to the shaft 48 adjacent its outer end is a hub 70 to which there are splined friction discs 72 that alternate with other friction discs 72 which are splined to the retainer 46. The retainer is held axially in place by a flanged sleeve 81. Bolted or otherwise secured to the flange of the sleeve 81 is a cap member 75 to which a piston 76 is fastened by screws or other suitable fastening means. Mounted to slide on the piston 76 is a cylinder 78 which is adapted to engage at its inner end with the outermost of the friction discs 72. A conventional seal 79 is secured by screws or in any other suitable manner to the outer end of the cylinder 78 to prevent leakage of the hydraulic motive fluid along the piston 76. The piston has a guide pin 80 integral with it on which the cylinder 78 also is mounted and guided. Hydraulic motive fluid is supplied selectively to opposite sides of the piston from conduits 82 and 83 which are connected with ducts 84 and 85, respectively, built in the piston.

When the hydraulic motive fluid is supplied through the duct 85 to the inner face of the piston 76, the cylinder 78 is moved inwardly to apply a braking effect to the friction discs 72. When the shaft 48 is braked, the pinion 50 cannot turn, nor can the gear 51. Thus the gear 54 will be held stationary, and as the table 25 revolves, then, the pinions 56 will rotate on the stationary gear 54 causing the screw shafts 57 to rotate, thereby causing the nuts 65 to move the slides 42 either inwardly or outwardly, depending on the direction of the rotation of the shafts 57, to either clamp or unclamp the work. When the jaws have clamped the work, the friction discs will slip on one another. A timer (not shown) controls the time of application of the motive fluid between the inner face of the piston 76 and the confronting face of the cylinder 78, so that after the wheel has been securely clamped, the brake pressure on the shaft 48 will be released. The shaft 48 will then be free to turn, since all the gears 50, 51, and 54 are then free to move. The table 25, as it revolves will then simply rotate the gears 51 and 54 without revolving the pinions 56 so that the jaws will stay in the positions to which they have been moved. If desired, a limit switch may be provided to be tripped by the cylinder 78 to insure that the cylinder will be in released position before the table can rotate at high speed.

To load and unload the work from the work spindle an elevator mechanism is provided. This elevator mechanism comprises a tubular sleeve 90 (FIGS. 3 and 4) which is reciprocable axially in the work spindle 24. A piston 92 is secured to the sleeve against a shoulder on the sleeve by means of a clamping nut 93 that threads onto the sleeve 90. The piston reciprocates in a cylinder 95 which is fastened by bolts 96 to a cast portion of the bed or frame 20 of the machine. The lower end of the cylinder 95 is closed by a cap member 97; and suitable seals are provided between the piston 92 and the cylinder 95 and between the cap member 97 and the sleeve 90. A labyrinth seal 94 is threaded on the lower end of the spindle 24 below antifriction bearing 22 and within an enlarged pocket formed integral with the cylinder 95 above the upper wall thereof. A mating labyrinth seal is secured to the base 20 by screws 98.

Figure 4:
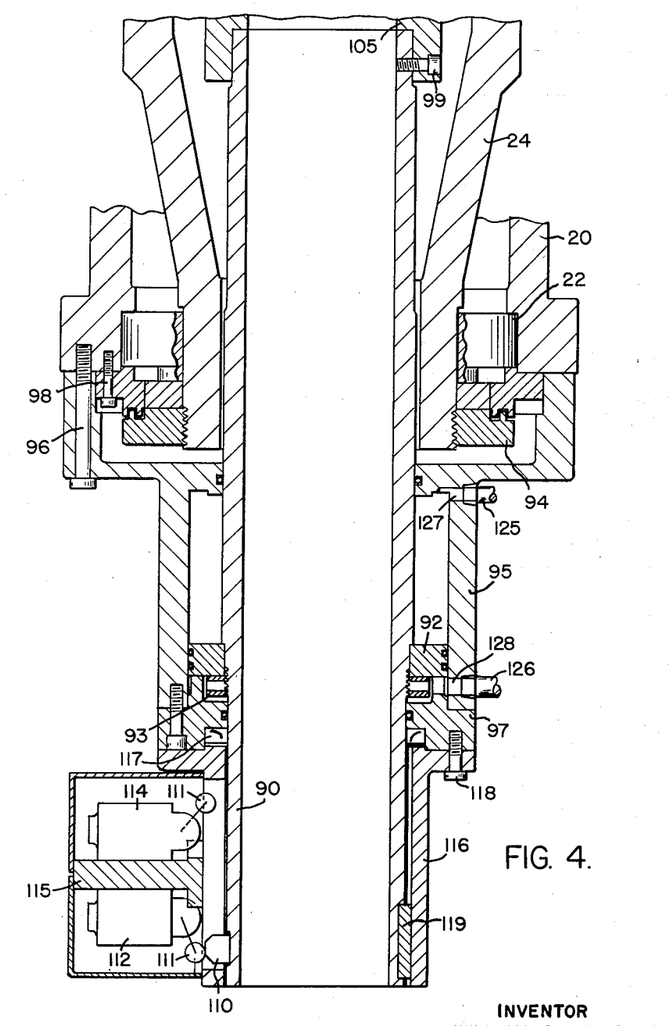
FIG. 4 is a fragmentary axial section on a still further enlarged scale showing a part of the work spindle and the elevator associated therewith.

Fastened on the upper end of the sleeve 90 as by screws 99 is a second sleeve 100 that slides in a bushing 102 which is interposed between the sleeve 100 and the work spindle 24. Secured to the sleeve 100 by screws 104 is a head 105 which is recessed on its upper face, as denoted at 106, to receive the hub 108 of a car wheel.

Fastened adjacent the lower end of the sleeve 90 is a trip member 110 which is positioned to engage the rollers 111 of two limit switches 112 and 114, respectively, as the hollow elevator shaft 90 rises and descends. The limit switches 112 and 114 are secured to opposite sides of a flange 115 on a guard sleeve 116 that is fastened by means of screws 118 to the cap 97. A conventional dust seal 117 is mounted in a recess in end cap 97 in opposed relation to the upper end flange of sleeve 116 to minimize the possibility of entry of dirt or grit into cylinder 95. The piston 92 itself, as shown, carries O-ring seals. O-ring seals, too, are provided adjacent the upper and lower ends of cylinder 95 to minimize possibility of leakage of the motive fluid from the cylinder. The tubular shaft 90 is held against rotation during its reciprocating movement by a key 119 that engages in a key slot in the guard 116.

When hydraulic pressure is applied on the under side of the piston 92, the elevator rises to receive a workpiece. In this rising movement the trip member 110 trips the limit switch 114 which starts the drive motor 30 for the work table in the direction to open the jaws 35. When the elevator has received the wheel, and the jaws are open, they trip a limit switch, which reverses the direction of the motive fluid to the piston 92, causing the elevator to descend. When the trip member 110 has descended far enough, it trips the limit switch 112, which causes the motor 30 to be driven in the opposite direction to close the jaws on the workpiece and clamp it to the table.

The hydraulic motive fluid is adapted to be supplied selectively to the upper and lower ends of the cylinder 95 above and below the piston 92 from conduits 125 and 126 (FIG. 4) through ducts 127 and 128, respectively, in the cylinder wall.

Because the sleeve 100 is tubular and becaues its bore aligns axially with the bore being turned in the workpiece 108, the chips turned up by the boring tools will drop down through sleeve 100. A conveyor may be disposed between the open bottom of the sleeve to convey these chips away from the machine.

Figure 6:
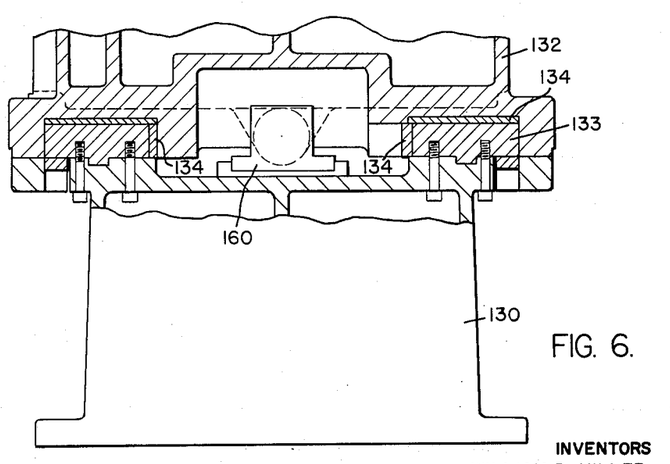
FIG. 6 is a fragmentary vertical section taken at right angles to FIG. 1, showing a portion of the upright and of the support on which it slides.

Mounted upon the base or bed 20 of the machine is a spacer or supporting block 130 (FIGS. 1 and 6), on which the upright 132 of the machine is slidably mounted. The support 130 has ways or rails 133 secured on its upper face; and the upright 132 is formed with guide surfaces to fit over and travel on these ways. Liners 134 are interposed between the rails and the guide surfaces. These liners may be renewed when worn.

The upright 132 is formed on its front face in conventional fashion with ways on which there reciprocates vertically the ram 140 which carries the boring bar 141. The ram may be of conventional construction, and may be reciprocated in conventional manner being provided internally with a cylinder 143 (FIG. 2) which is closed at opposite ends by cap members 144 and 145. A stationary piston 147 reciprocates in the cylinder. This piston is secured to a tubular rod 148 that is held fixedly at its upper end by the extension 149 of the upright. Mounted within the tubular member 148 is a second tube 150 which is disposed coaxially with the tube 148 but spaced radially therefrom so as to form therewith a duct through which the motive fluid may be supplied to or exhausted from the port 151 which is provided in the tube 148 above the piston 147. The tube 150 itself is open at its lower end so that the hydraulic motive fluid may be supplied through this tube to the lower end of the cylinder 143 or exhausted therefrom. This is conventional construction and need not be described further.

Figure 2:
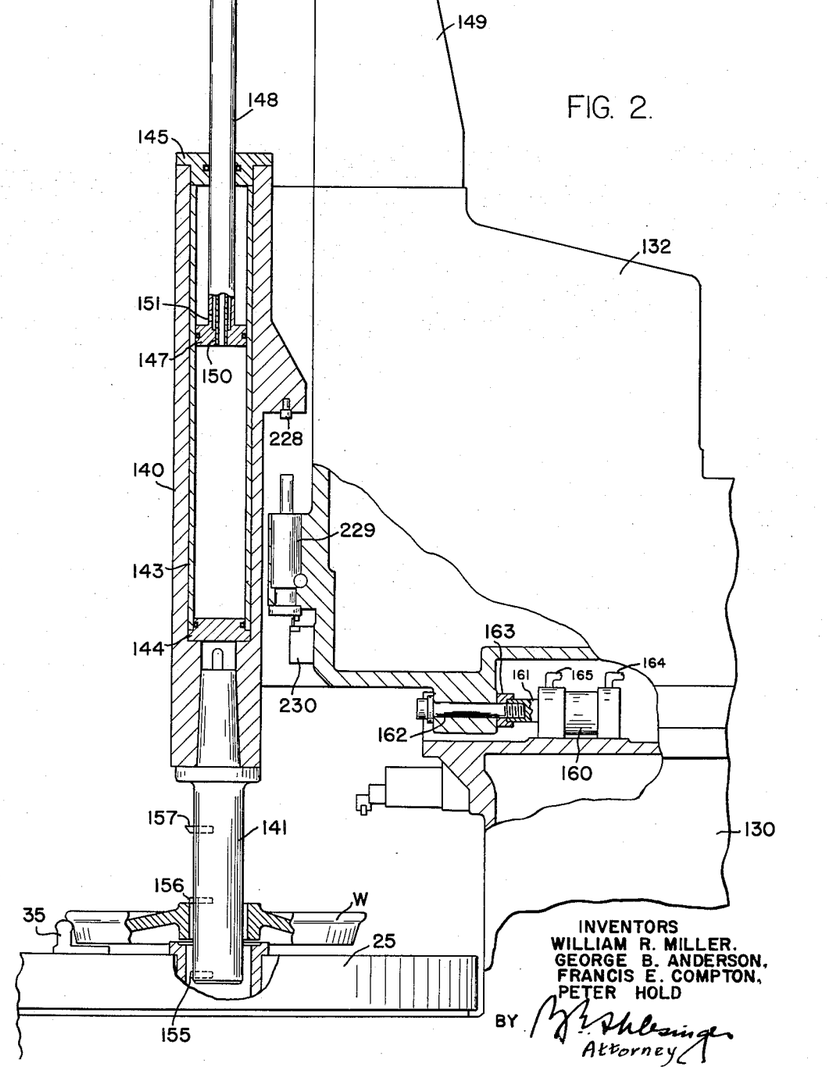
FIG. 2 is a fragmentary side elevation on an enlarged scale, with parts broken away, showing the boring tool in engagement with a car wheel in process of boring the wheel.

The boring bar 141 is shown as carrying a roughing tool 155, a finishing tool 156, and a chamfering tool 157. The boring bar differs from the boring bars conventionally used in that it carries only one roughing tool, one finishing tool, and one chamfering tool. Ordinarily two tools of each kind are provided on a boring bar. These tools are positioned in the boring bar in diametrically opposed relation; and the diameter of the hole to be bored in the work is determined by the setting of the two diametrically opposed tools. In the machine of the present invention, in contrast with conventional boring machines, the diameter of the bore in the work is determined by adjustment of the upright in such direction as to change the position of the boring tool radially of the axis of the work.

The adjustment of the upright is effected by application of fluid pressure to a piston (not shown) which reciprocates in a cylinder 160 (FIG. 2) which is mounted on the support 130. Secured to the piston is a piston rod 161 which is connected by means of stud 162 and nut 163 to the upright, to transmit the motion of the piston to the upright. The motive fluid is supplied selectively to opposite sides of the piston through conduits 164 and 165 that are connected to the cylinder 160.

Figure 7:
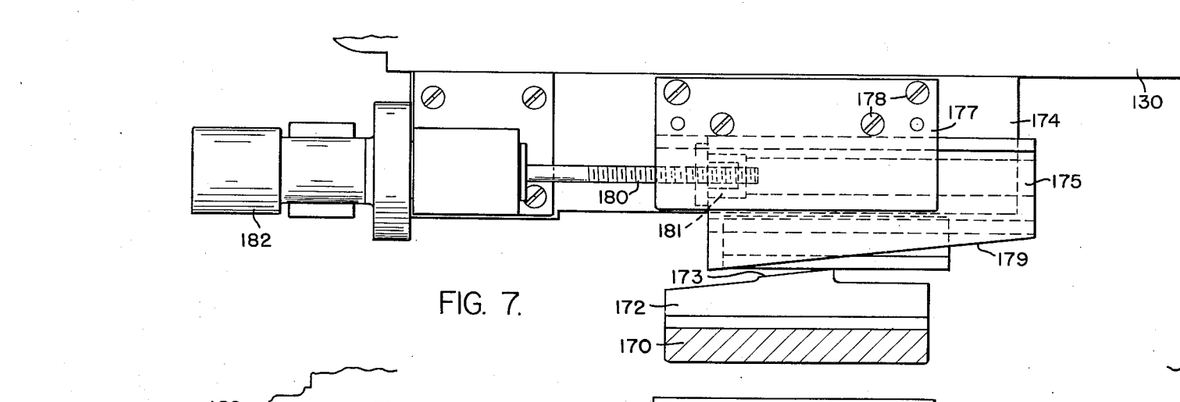
FIG. 7 is a fragmentary plan view on an enlarged scale showing the parts which control the amount of feed movement of the upright.

The position of the upright is determined preferably by measurement of the part, which is to fit into the hole that is to be bored in the work. One manner in which this adjustment can be effected precisely is shown diagrammatically in FIG. 9. For the purpose of effecting this adjustment precisely, a bracket 170 (FIG. 1) is secured to the rear of the upright 132. Mounted upon this bracket is a plate 172 (FIG. 7) which has a front inclined or wedge surface 173. Secured to the support 130 to project rearwardly therefrom is a bracket 174 that is provided with spaced, parallel ways on which a slide 175 reciprocates. One of these ways is denoted at 177 and is fastened to the bracket 174 by screws 178. The slide 175 has a rear, inclined or wedge surface 179 corresponding in inclination to the inclination of the surface 173 of the block 172. The slide 175 is adapted to be moved on the bracket 174 by a screw 180 which engages a nut 181 which is fastened to the slide and which is driven by a motor 182. The motor, when actuated, rotates the screw 180 to adjust the slide 175 laterally on the bracket 174. The cooperating blocks 175 and 172 determine the operating position of the upright 132 and boring bar 141 relative to the work, that is, the diameter of the bore to be formed in the work. The piston in cylinder 160 (FIG. 2) will move the column 132 on the base member 130 until the block 172 abuts against the slide 179 in the adjusted position of the slide 179.

Figure 8:
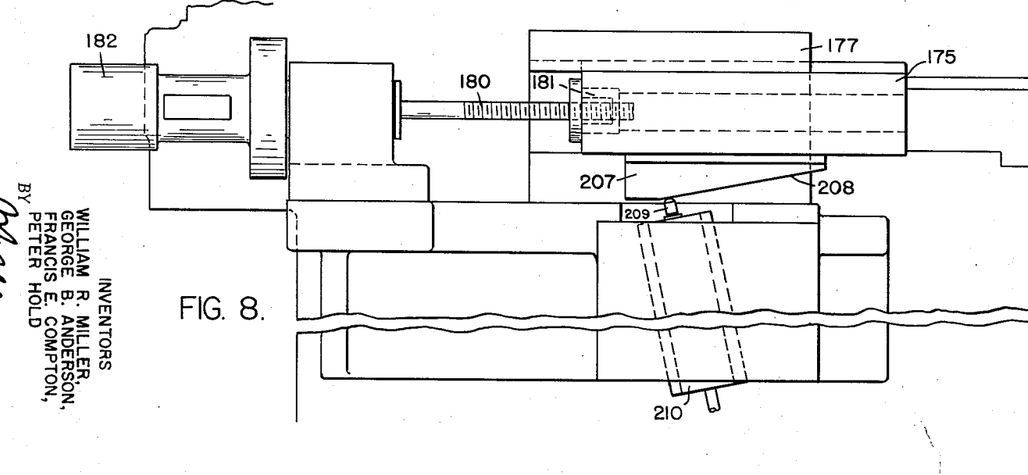
FIG. 8 is a rear view of these parts.

The slide 175 can be set precisely by measurement of the diameter of the part which is to go into the hole which is to be bored in the workpiece on the boring machine. One way in which this is done is illustrated diagrammatically in FIG. 9. Here A indicates a car wheel axle; and 190 is one of the wheel bearing portions of this axle. 191 is a rest for holding the axle during measurement. To measure the diameter of the wheel bearing fit 190 a caliper 192 may be used having jaws 193 and 194, one of which is movable toward and away from the other. Jaw member 193 may, for instance, slide in a guide way formed in jaw member 194, jaw member 193 being secured to the piston rod 195 of a piston (not shown) which reciprocates in a cylinder 196. Secured to the moving jaw 193 of the caliper is a block 197 which has an inclined or wedge surface 198 that is engaged by the plunger 199 of a transducer 200. This transducer is connected by line 202 with one terminal of a Wheatstone bridge 205. Secured beneath the slide 175 (FIGS. 7 and 8) is a block 207 which has an inclined under surface 208 of the same inclination as the surface 197. The plunger 209 of a transducer 210 engages this inclined surface 208. The transducer is connected by a line 212 with another terminal of the Wheatstone bridge. Thus, as the caliper jaw 193 is moved, the transducer 200 will be actuated to vary the resistance on one side of the Wheatstone bridge, and the motor 182 will operate to move block 175 and inclined surface 208, which in turn moves transducer plunger 209 until balance is obtained in the Wheatstone circuit. The motor is connected by line 214 with the Wheatstone bridge. A galvanometer 215 may be employed in conventional manner to indicate any unbalance in the circuit.

The rate of movement of the ram 140 and of the boring bar 141 may be controlled in conventional manner by means of trip jaws 220, 221, 222 and 223 (FIG. 1), which trip the bell crank lever 225 which is pivotally mounted on the upright and which is connected by rod 226 in conventional manner to the valve which controls the speed and direction of the ram movement. This is conventional construction and need not further be described here. A button 228 (FIG. 2) is provided on the ram to trip in conventional fashion the plunger 229 which operates a limit switch that controls a timer 230 which insures completion of the chamfering operation on the wheel hub before the ram is reversed and the boring bar is withdrawn from the work.

Figure 9:
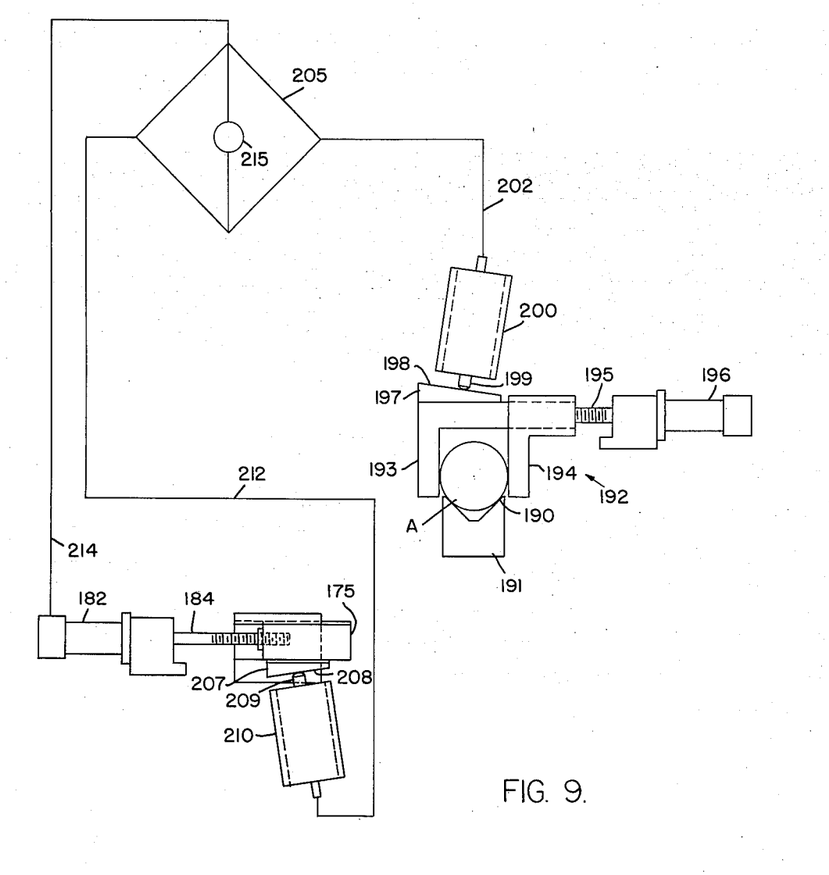
FIG. 9 is a diagrammatic view illustrating how the amount of movement of the upright is controlled from the diameter of the part which is to fit into the hole being bored in the workpiece, that is, for a car wheel, from the diameter of the wheel bearing fit portion of the axle on which the wheel is to be mounted.

Obviously, instead of transducers, Selsyn units might be used to connect and drive the screw 184 and a corresponding screw for moving caliper jaw 193 to position the upright 132 precisely in accordance with the finished diameter of the bore which it is desired to produce in the work.

A limit switch 235 (FIG. 1) may be provided to trip and stop the mechanism for conveying the work pieces to and from the machine. This limit switch may be positioned on the support 130 in position to be engaged by a carwheel W after a boring operation has been completed on the wheel and the wheel is lifted out of the work jaws in order to remove it from the machine. The work may be grasped, for instance, by gripping jaws carried by an indexable table; and the limit switch, when tripped, may close a circuit to the motor of this table to rotate the table to swing the completed wheel away from the machine and to bring another wheel into position on the elevator 100.

The operation of the machine will be understood from the preceding description but may be summed up here briefly.

The diameter of the hole to be finish-bored in the workpiece is determined by gauging the diameter of the wheel bearing portion of the axle on which the carwheel is to be used. As the caliper jaws 193 and 194 (FIG. 9) close on the workpiece, transducer 200 is actuated. Through the Wheatstone bridge circuit and transducer 210 this causes motor 182 to move block 175 (FIGS. 7 and 8) until a balance is obtained in the circuit. Block 175 is a stop cooperating with block 172 (FIGS. 1, 7 and 8) and determining the position of the boring bar 141 radially of the work.

The workpiece, which is to be bored, is delivered onto the elevator head 105 (FIG. 3) in the upper limit position of the elevator. When the machine is started, the elevator descends bringing the workpiece down between the then-open jaws 35. To prevent the workpiece from dropping down onto the table so far that it could not be gripped properly by the jaws when they close on the workpiece, conventional rests or parallel 123 (FIG. 3) are secured to the table between successive jaws by means of screws 124. The workpiece is picked up off these rests by the jaws as they close on the workpiece. When the trip member 110 (FIG. 4) trips limit switch 112, the descent of the elevator is stopped, and the motor 30 (FIG. 1), which drives the table is started.

At this time the cylinder 78 (FIG. 3) will be in its inner position causing engagement of disc clutch 72. Hence as the table 25 rotates, gears 51 and 54 will be held, and pinions 56 will rotate on gear 54. This will cause screw shafts 57 to revolve, threading the screws through nuts 65. This will cause jaw-bearing slides 42 to travel radially inwardly until the jaws 35 grip and clamp the workpiece. Then the friction clutch will slip. Through a timer, which is actuated when limit switch 112 (FIG. 4) is tripped, the direction of application of the pressure fluid to cylinder 78 (FIG. 3) will be reversed and shaft 58 will be released. As the table 25 continues to rotate then the boring bar 141 will descend to first rough-bore, then finish-bore, then chamfer the carwheel. Then the boring bar will be withdrawn from the wheel through operation of the conventional controls of a conventional carwheel boring machine.

When the boring bar has cleared the work, the cylinder 78 may again be actuated to cause disc clutch 72 to brake the shaft 48, and motor 30 will be reversed. This will cause the clamping jaws 35 to be withdrawn to release the work. When the clamping jaws have been released, through a lug on one of the jaws a limit switch is tripped which stops motor 30; and the solenoid-operated valve, which controls the direction of flow of the motive fluid to cylinder 95 (FIG. 4), is reversed; the elevator ascends lifting the work clear of the table 25 and delivering it to a conveyor for removal from the machine. The cycle is complete.

While the invention has been described in connection with one embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. In a boring machine, a base, a work spindle rotatably mounted on said base, a tool support adjustable on said base in a direction generally radial of the axis of rotation of said work spindle, a ram reciprocable on said tool support in the direction of said axis, a boring tool secured to said ram, cooperating stops on said base and said tool support, respectively, one of said stops being adjustable, adjustable means for measuring the outside diameter of a part, which is to engage in the bore of the workpiece that is to be machined on the boring machine, means actuated by adjustment of said adjustable measuring means for adjusting said adjustable stop, means for adjusting said tool support on said base until the other stop engages said adjustable stop thereby to determine the position of said boring tool radially relative to the axis of said work spindle, means for rotating said work spindle, and means for simultaneously effecting movement of said ram to cause the boring tool to machine a bore of the desired diameter in the workpiece as the workpiece revolves relative to the rectilinearly moving boring tool.

2. A boring machine as claimed in claim 1 wherein said adjustable measuring means comprises an adjustable caliper, and a first electrical transducer operatively connected to said caliper to be actuated upon adjustment of said caliper, and wherein the means for adjusting said adjustable stop includes a second electrical transducer, a motor for actuating said stop adjusting means, and an electrical circuit including a Wheatstone bridge for connecting the transducers and the motor.

3. In combination a boring machine having a base, a work table rotatably mounted on said base, an upright mounted on said base for adjustment in a direction generally radial of the axis of rotation of said work spindle, a ram reciprocable on said upright rectilinearly in the direction of said axis, a boring bar secured to said ram to project therefrom in the direction of said axis, a boring tool secured in said boring bar to project laterally therefrom, cooperating stops on said base and said tool support, respectively, one of said stops being adjustable, fluid-pressure actuated means for adjusting said tool support on said base until the other stop engages said adjustable stop thereby to determine the position of said boring tool radially relative to said axis, means for rotating said work table, means for simultaneously effecting movement of said ram to cause said boring tool to machine a bore of the desired diameter in the workpiece that is to be bored on the machine, means for measuring the outside diameter of the part which is to engage in the bore of said workpiece, and means connecting said measuring means to said adjustable stop to set said stop in accordance with the measured outside diameter of said part.

4. A machine tool having a rotary work support, a plurality of clamping jaws reciprocable radially of the axis of said work support toward and from work-clamping position, a pair of sun gears mounted rotatably on said work support coaxially therewith, a plurality of planetary pinions meshing with one of said sun gears, means connecting one of said planetary pinions to each of said jaws to effect movement of said jaw radially of said axis in one direction or the other depending upon the direction of rotation of each pinion, a pinion meshing with the other of said sun gears, means for frictionally holding the last-named pinion against rotation to hold said other sun gear frictionally against rotation to cause said planetary pinions to revolve on the first-named sun gear while said work support rotates relative to said sun gears thereby to move said clamping jaws toward or from work-clamping position depending on the direction of rotation of said work support, said frictional holding means slipping when said clamping jaws are in work-clamping position, and means for selectively moving said frictional holding means into and out of operative position, and means for rotating said work support selectively in either direction about its axis.

5. A machine tool as claimed in claim 4 wherein said sun gears are bevel gears and said pinions are bevel pinions whose axes are radial of the axis of said work support.

6. A machine tool as claimed in claim 5 wherein the means for effecting reciprocation of the jaws comprises a plurality of screws which extend radially of the axis of the work support and to each of which one of said planetary pinions is connected so that the planetary pinion and associated screw rotate together, and a plurality of nuts through each of which one of said screws thread, one of said nuts being secured to each of said jaws.

7. A boring machine having a base, a tubular work spindle journaled in said base for rotation about a vertical axis, a work table secured to said spindle to rotate therewith, an elevator reciprocable axially in said spindle and having a head adapted to receive a workpiece and to lower said workpiece onto, or to raise the workpiece off, said work table upon lowering or raising, respectively, of said elevator, a plurality of clamping jaws reciprocable radially of the axis of said work table toward and away from work-clamping position, a pair of sun gears mounted rotatably on said work table coaxially therewith, to rotate together and secured against rotary movement relative to one another, a plurality of planetary pinions meshing with one of said sun gears, means connecting one of said planetary pinions to each of said jaws to effect movement of said jaw radially of said axis in one direction or the other depending upon the direction of rotation of the pinion, a pinion meshing with the other sun gear, means for frictionally holding the last-named pinion against rotation thereby to hold said sun gears against rotation and cause said planetary pinions to revolve on the first-named sun gear as said work table rotates relative to said sun gears, means for raising and lowering said elevator, means for driving said work table, means actuated by said elevator at the upper limit of its raising movement to start said driving means to effect drive of said work table in one direction, and means actuated by said elevator at the lower limit of its lowering movement to start said driving means to effect drive of said work table in the opposite direction.

8. A boring machine having a base, an elongate tubular work spindle journaled on bearings in said base for rotation about a vertical axis, a work table secured to the upper end of said spindle to rotate therewith on said base and having an opening centrally therethrough aligned axially with the bore of said spindle, an elevator shaft reciprocable vertically axially in the bore of said work spindle and having a head at its upper end disposed in said opening and adapted to receive a workpiece, means for moving said elevator shaft axially in said bore and in said opening in one direction to project said head above said table to receive a workpiece or to raise the workpiece off said table and for moving said elevator shaft axially in the opposite direction to lower said workpiece onto said work table, and separate means mounted on said work table and operable independently of said elevator shaft for clamping the workpiece to said table.

9. A boring machine as claimed in claim 8 having means for rotating said work table, and means positioned to be tripped by said elevator shaft when it is lowered to actuate the means for rotating said work table.

10. In combination, a boring machine having a bed, a work support and a tool support mounted on said bed, one of said supports being rotatable relative to the other, a tool mounted on said tool support, means for effecting rectilinear movement between said tool and said work support in the direction of the axis of said rotatable support during rotation of said rotatable support to bore a hole in a workpiece secured to said work support, one of said supports being adjustable relative to the other radially of the axis of said rotatable support to position said tool at a radial distance from the center of the workpiece in accordance with the diameter of the hole to be bored in the workpiece, means for radially adjusting said radially adjustable support, and means controlling the amount of said adjustment in one direction comprising two cooperating stop members, one of which is secured to said radially adjustable support and the other of which is secured to said bed, gauging means comprising two members, one of which is movably adjustable relative to the other to measure the outside diameter of a part which is to engage in the bore of the workpiece, and means operatively connecting said movable gauging member to one of said stop members to adjust said one stop member upon movement of said movable gauging member in accordance with the amount of movement of said one movable gauging member which is required to measure the diameter of said part, whereby to position said one stop member so as to limit by its engagement with the cooperating stop member the radial adjustment in said one direction of said radially adjustable support.

11. The combination claimed in claim 10 wherein said measuring means comprises an adjustable caliper, and a first electrical transducer operatively connected to said caliper to be actuated upon adjustment of said caliper, and wherein said adjusting means includes a second electrical transducer, a motor for actuating said adjusting means, and an electrical circuit including a Wheatstone bridge for connecting the transducers and motor.

References Cited in the file of this patent

UNITED STATES PATENTS

| | | |
|---|---|---|
| 629,042 | Moreton | July 18, 1899 |
| 1,129,545 | Blau | Feb. 23, 1915 |
| 1,515,347 | Kucera | Nov. 11, 1924 |
| 1,531,327 | Wood | Mar. 31, 1925 |
| 1,650,693 | Cole | Nov. 29, 1927 |
| 2,183,369 | Schurr | Dec. 12, 1939 |
| 2,445,497 | Schurr | July 20, 1948 |
| 2,457,558 | Hornfeck | Dec. 28, 1948 |
| 2,471,006 | Olson | May 24, 1949 |
| 2,632,956 | Crosby | Mar. 31, 1953 |
| 2,634,644 | Johnson | Apr. 14, 1953 |
| 2,637,237 | Montgomery | May 5, 1953 |
| 2,641,969 | Roehm | June 16, 1953 |
| 2,714,325 | Junker | Aug. 2, 1955 |
| 2,748,665 | Senn | June 5, 1956 |
| 2,809,539 | Hennessy | Oct. 15, 1957 |